(12) United States Patent
Lundin

(10) Patent No.: US 6,614,972 B1
(45) Date of Patent: Sep. 2, 2003

(54) COUPLER FOR TRANSPORTING AND DISTRIBUTING LIGHT TO MULTIPLE LOCATIONS WITH UNIFORM COLOR AND INTENSITY

(75) Inventor: David J. Lundin, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/497,834

(22) Filed: Feb. 3, 2000

Related U.S. Application Data

(63) Continuation-in-part of application No. 09/203,951, filed on Dec. 2, 1998.

(51) Int. Cl.$^7$ .................................................. G02B 6/04
(52) U.S. Cl. ....................... 385/121; 385/120; 385/115; 385/116
(58) Field of Search ............................ 385/32, 31, 115, 385/116, 120–121, 146

(56) References Cited

U.S. PATENT DOCUMENTS

| | | | |
|---|---|---|---|
| 3,933,409 A | 1/1976 | Kloots ...................... 350/96 B |
| 4,101,188 A | * 7/1978 | Yevick ........................ 385/121 |
| 4,184,739 A | 1/1980 | D'Auria et al. .......... 350/96.15 |
| 4,422,719 A | 12/1983 | Orcutt ....................... 350/96.3 |
| 4,743,082 A | 5/1988 | Mori .......................... 350/96.1 |
| 4,807,963 A | * 2/1989 | Iwasaki ..................... 385/121 |
| 4,918,579 A | 4/1990 | Bennett ........................ 362/32 |
| 4,976,508 A | 12/1990 | Okura et al. ............. 350/96.23 |
| 5,030,321 A | 7/1991 | Coutandin et al. .......... 156/643 |
| RE33,722 E | 10/1991 | Scifres et al. ................. 385/33 |
| 5,058,985 A | 10/1991 | Davenport et al. ......... 385/115 |
| 5,109,448 A | 4/1992 | Coden et al. ................. 385/46 |
| 5,208,884 A | 5/1993 | Groh et al. ................... 385/46 |
| 5,222,180 A | * 6/1993 | Kuder et al. ................ 385/115 |
| 5,259,056 A | 11/1993 | Davenport et al. ......... 385/115 |
| 5,311,604 A | 5/1994 | Rogner et al. | |
| 5,346,655 A | 9/1994 | Blyler, Jr. et al. ......... 264/1.28 |
| 5,369,721 A | 11/1994 | Conti ........................... 385/115 |
| 5,629,996 A | 5/1997 | Rizkin et al. ................. 385/31 |
| 5,751,870 A | 5/1998 | Forkner et al. ............... 385/33 |
| 5,790,723 A | 8/1998 | Riser et al. ................... 385/31 |
| 5,790,725 A | 8/1998 | Rykowski et al. ............ 385/33 |
| 5,791,756 A | 8/1998 | Hulse et al. ................... 362/32 |
| 5,838,865 A | * 11/1998 | Gulick ........................ 385/121 |
| 5,857,041 A | 1/1999 | Riser et al. ................... 385/31 |
| 6,296,383 B1 | * 10/2001 | Henningsen .................. 385/31 |

FOREIGN PATENT DOCUMENTS

| | | | |
|---|---|---|---|
| DE | 43 09 389 A1 | 9/1993 | ............. F21S/5/00 |
| EP | 284 098 | 9/1988 | |
| EP | 0 579 357 A1 | 1/1994 | |
| EP | 0 833 174 A2 | 4/1998 | |
| WO | WO 00/33112 | 6/2000 | ............. G02B/6/06 |

OTHER PUBLICATIONS

P. J. Severin et al.: "Passive Components For Multimode Fiber–Optic Networks" Journal of Lightwave Technology., vol. LT–4, No. 5, May 1986, pp. 490–495, XP002159762, IEEE. New York, US, ISSN: 0733–8724 the whole document.

* cited by examiner

*Primary Examiner*—Frank G. Font
*Assistant Examiner*—Sang H. Nguyen

(57) ABSTRACT

A light transport device comprises light fibers that individually have predetermined cross sections at one end that may be bundled together to provide a bundled region that terminates in a continuous plane, suitable for light input, that is substantially free of voids and free of non-light-transmitting materials. The other end of the individual light fibers has a cross section that is useful for emission of light from a single fiber. In the absence of non-light-transmitting materials, light propagating in each of the light guides undergoes mixing by being coupled, while traveling in the bundled region, from one light guide to another, thus reducing nonuniformities in the color and intensity of the light emitted by the fibers.

31 Claims, 2 Drawing Sheets

COUPLER FOR TRANSPORTING AND DISTRIBUTING LIGHT TO MULTIPLE LOCATIONS WITH UNIFORM COLOR AND INTENSITY

RELATED APPLICATION

This application is a continuation-in-part of U.S. Application Ser. No. 09/203,951 entitled "Apparatus for Transporting and Distributing Light Using Multiple Light Fibers," filed in the U.S. Patent and Trademark Office on Dec. 2, 1998, which is herein incorporated by reference.

FIELD OF THE INVENTION

The present invention relates generally to methods and apparatuses for transporting light from a single light source to multiple locations, and more particularly, to a method of and apparatus for transporting light from a single light source to multiple locations using a plurality of light fibers.

BACKGROUND OF THE INVENTION

Optically transmissive materials, such as glass or polymers, may be used as a light guide to propagate light. A light guide typically includes at least one surface adapted to receive light from a light source and an optically smooth surface for reflecting light propagating through or along the light guide. Common examples of light guides include optical fibers traditionally used in the data communication industry and, more recently, light fibers used for illumination purposes. For example, U.S. Pat. No. 4,422,719 (Orcutt) discloses one such light guide employing light fibers. In this device, at least one end surface of the light fiber is adapted to receive light from a light source, which light propagates axially through or along the fiber. Planar waveguides used in the optical display industry are another example of light guides. In these devices, at least one end of the surface of the waveguide is adapted to receive light from a light source, and light injected into the light guide propagates between the two major surfaces of the light guide.

Multiple light fibers can be bundled together to form a light transport device that accepts light from a single source and emits light in directions that are determined by the orientation of the output ends of the fibers. In many cases, it is desirable that the light emitted by the fiber outputs ends be uniform in color and intensity with respect to one another. Unfortunately, such uniformity can be difficult to achieve because light sources typically used to generate light are inhomogenous across their surfaces. That is, each portion of a given light emitting surface emits light that differs in color and intensity. As a result, when a light source is arranged to direct light into the input ends of a bundled fiber arrangement, the color and intensity of the light received by the individual fibers will depend on the portion of the light source surface from which the light is received. Thus, the color and intensity of light emitted from the bundle will generally vary from fiber to fiber.

To enhance the color and uniformity of light emitted by the combined fiber outputs, a mixing element is sometimes inserted between the light source and the input ends of the bundled fibers. For example, U.S. Pat. No. 5,367,590 (Davenport et al.) discloses a mixing element that is formed from a segmented coupler that includes multiple internal reflective surfaces to achieve some degree of mixing to provide uniform color light. This mixing element requires many reflective surfaces to achieve a high degree of mixing and is thus susceptible to significant optical loss. Moreover, the mixing element is relatively complex in design.

Accordingly, it would be desirable to provide a simple, inexpensive and efficient light transport device requiring a minimum of components so that light received from a common source is distributed among a plurality of fibers with uniform color and intensity.

SUMMARY OF THE INVENTION

The present invention solves this problem by fabricating light guides such as light fibers with cross-sectional shapes appropriately selected so when the ends are brought into contact with one another in a light injection surface, they form a continuous plane substantially free of voids and free of non-light-guiding material, such as fiber cladding. As a result, light propagating through fibers in direct contact with one another will be able to propagate from one fiber into another so that the light from all fibers is mixed together. Advantageously, mixing will take place without the need for an additional mixing element that is separate from the light fibers themselves.

In one aspect, the present invention relates to an apparatus for transporting light, which includes multiple fibers each having a contacting end and a non-contacting end. The contacting ends, which are assembled into a bundled region that terminates in a light injection plane, have a prescribed cross-sectional shape prior to contacting one another such that, when brought into contact, adjacent contacting ends have outer edges completely contiguous with one another so that the light injection plane is substantially free of voids while each of the contacting ends maintains its respective prescribed cross-sectional shape. The bundled region is configured so that light propagating in the light fibers undergoes mixing by being coupled from one light fiber to another. Light in each fiber will therefore be mixed, reducing or even eliminating any inhomogeneities in color or intensity that may have initially been present.

In another aspect, the present invention relates to an apparatus of the type described above in which the entire bundled region is substantially free of both voids and non-light guiding material such as a cladding, for example. That is, adjacent fiber cores are in direct contact with one another to facilitate the mixing of light among the fibers.

In yet another aspect, the present invention relates to an apparatus of the type described above in which the bundled region has a length that is sufficient to ensure that light directed from a light source into the light injection plane is substantially uniform in color and/or intensity when being emitted from each of the noncontacting ends of the light guides.

In still another aspect, the present invention relates to an apparatus of the type described above in which at least one of the contacting ends has a noncircular cross-sectional shape, such as a sector or a rectangle.

In yet another aspect, the present invention relates to an apparatus of the type described above in which the apparatus includes N light fibers, where N is an integer greater than or equal to 2. Each of the N light fibers has a cross-sectional shape corresponding to a sector. The N sectors may each extend over an angle of 360/N degrees. Alternatively, at least two of the N sectors have a different angular extent.

In still another aspect, the present invention relates to an apparatus of the type described above in which the plurality of contacting ends have cross-sectional shapes that differ from one another. In this embodiment, one or more of the contacting ends may have an irregular cross-sectional shape.

In yet another aspect, the present invention relates to an apparatus of the type described above in which the non-contacting end of at least one of the light fibers has a circular cross-section.

In some embodiments of the invention described above, the non-contacting end of at least one of the light fibers has a cross-sectional shape corresponding to the prescribed cross-sectional shape of its contacting end. In other cases, the non-contacting end of at least one of the light fibers has a cross-sectional shape different from the prescribed cross-sectional shape of the contacting end. If the contacting and non-contacting ends of at least one light fiber differ in shape, the light fiber undergoes a transition from the cross-sectional shape of its contacting end to the cross-sectional shape of its non-contacting end. The transition occurs over a predetermined portion of the length of the light fiber, which in some cases may be the entire length of the fiber.

In another aspect, the present invention relates to a method for transporting light from a single source to multiple prescribed locations. In accordance with the method, light is directed into a light injection plane formed by a plurality of light fiber input ends. The input ends of each light fiber have a prescribed cross-sectional shape selected such that adjacent input ends have outer peripheries contiguous with one another so that the light injection plane is substantially free of voids or other non-light-guiding materials. The output ends of the light fibers are then oriented so that light emitted therefrom is applied to the respective prescribed locations.

In yet another aspect, the present invention relates to a method for making a light transport device. In accordance with the method, a plurality of light fibers is provided, each having a contacting end and a non-contacting end. The contacting ends of the light fibers have prescribed cross-sectional shapes prior to being brought into contact with one another. The prescribed cross-sectional shapes are selected such that when the outer edges of the contacting ends are brought together in a given orientation, they will contact one another in a completely contiguous manner. Finally, the contacting ends are arranged in a bundled region that is configured so that light propagating in each of the light guides undergoes mixing by being coupled from one light guide to another. The light fibers employed in this or other embodiments of the present invention may be advantageously fabricated using a molding process.

DETAILED DESCRIPTION

It should be noted at the outset that the light provided by the light transport device of the present invention is not limited to visible wavelengths but may encompass other portions of the electromagnetic spectrum such as ultraviolet wavelengths, for example. In some embodiments of the invention the wavelengths of interest extend from about 200 nm to 1200 nm. Moreover, the term color as used herein should not only be construed as corresponding to a single wavelength. Rather, the term color is also used to describe the appearance of an object as perceived by a viewer, which typically corresponds to a band of wavelengths over which there is some nonuniform intensity distribution. That is, color can refer to a single wavelength or a range of wavelengths. Finally, as used herein, the term "sector" shall be used in reference to a geometric figure bounded by two radii and the included arc of a circle.

Figure 1:
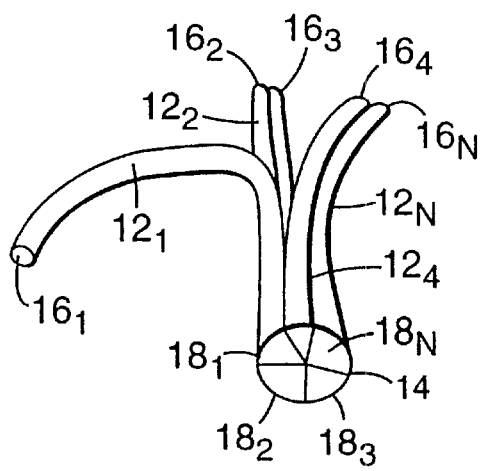
FIG. 1 depicts a perspective view of an exemplary light transport device constructed in accordance with the present invention.

FIG. 1 depicts a perspective view of a light transport device constructed in accordance with the present invention. A plurality of light fibers $12_1, 12_2, \ldots 12_N$ are brought into contact with one another at their respective input ends $18_1, 18_2, \ldots, 18_N$ to form a bundled region 10 that extends in three dimensions. Bundled region 10 terminates in a light injection surface 14 into which light from a light source is directed. The light injection surface 14 is defined by the input ends $18_1, 18_2, \ldots 18_N$ of the light fibers. As is well known, light injected into the individual input ends of each fiber is transported along the fiber core in accordance with the principles of total internal reflection. Fibers $12_1, 12_2, \ldots 12_N$ have output ends $16_1, 16_2, \ldots 16_N$ that emit the light transmitted therethrough. Since the light fibers are flexible and need to remain in contact with one another only at their input ends, the output ends of the light fibers may be arranged in any desired configuration so that light can be provided to multiple locations. For example, as seen in FIG. 1, fibers $12_1, 12_2,$ and $12_4$ each emit light in a different direction.

Figure 2:
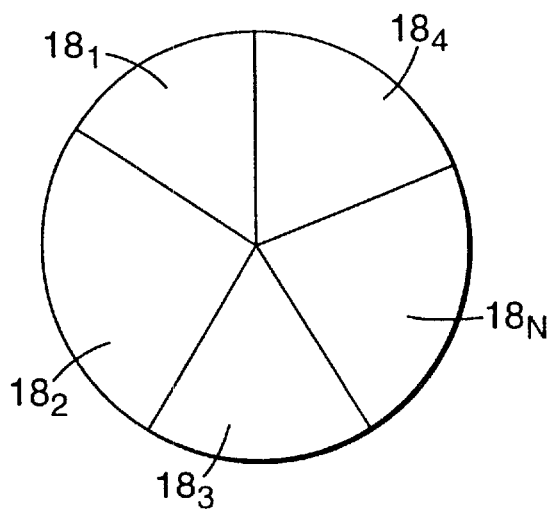
FIG. 2 depicts a front view of the light injection surface seen in FIG. 1.

As best illustrated in FIG. 2, the input ends $18_1, 18_2, \ldots 18_N$ of light fibers $12_1, 12_2, \ldots 12_N$ have cross-sectional shapes that differ from the circular shape of a conventional light fiber. Specifically, in the exemplary embodiment of the invention shown in FIGS. 1 and 2, the input ends of the light fibers are sectors which contact one another without creating any empty space or voids therebetween. That is, the outer edge surfaces of the input ends of adjacent fibers are completely contiguous with one another. Since this exemplary embodiment of the present invention employs five light fibers, each input end is a sector that subtends an angle of 72 degrees. Of course, if a fewer or greater number of fibers are employed, the arc length and associated angle of each sector can be adjusted accordingly to form a light injection surface that is essentially circular. The sectors need not be of equal area. For example, three sectors could each subtend an angle of 60 degrees, while the remaining two sectors could subtend angles of 90 degrees each.

In preferred embodiments of the invention bundled region 10, including light injection surface 14, is free not only of voids, but also of any materials or features (e.g., cladding) that interfere with the transmission of light into the fibers. In other words, the light fibers may consist simply of a core that is free of any surrounding cladding material. In these embodiments of the invention, adjacent fiber cores are in direct contact with one another. In the absence of cladding material, light propagating through fiber cores in direct contact with one another will be free to undergo coupling among the various fiber cores. As a result of the coupling process, the light in all fibers will be mixed, reducing any inhomogeneities in color or intensity that may have initially been present among them. The present invention therefore advantageously mixes light propagating in the fibers without the need for an additional mixing element that is separate and distinct from the light fibers themselves.

If bundled region 10 has a sufficiently long length, any color and intensity differences arising from non-uniformities in the light directed into light injection surface 14 will be substantially eliminated so that the light emanating from the output ends of the fibers will be uniform in color and intensity. The length of the bundled region (i.e., the length along the axis of the fibers over which the fibers are in contact with one another) necessary to accomplish this task will generally depend on various factors such as the characteristics of the light source and may be empirically determined for any given application.

While the light transport device of the present invention may be described to as a device for transporting light from a single source to a plurality of locations, one of ordinary skill in the art will recognize that the device can be employed in reverse. That is, the device can transport light from a plurality of sources to a single location by applying light to the output ends shown in FIG. 1 and using plane 14 as a light emission plane. In this regard it should be recognized that the terms "input" and "output" as used herein to define opposing ends of light fiber are employed for descriptive purposes only and should not be construed as limiting their applicability to receiving and emitting light, respectively. In other words, in appropriate circumstances, the "input ends", as described above, may be employed to emit light and "output ends", as described above, may be employed to receive light.

Figure 3:
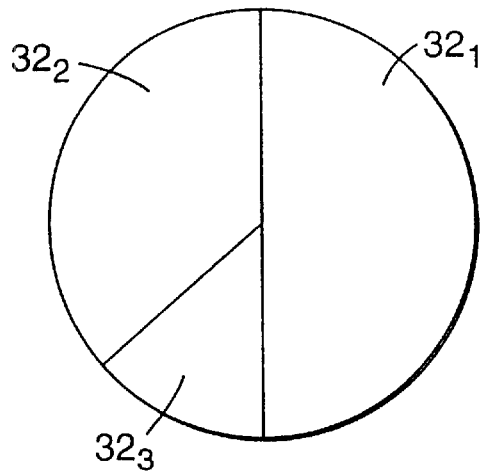
FIG. 3 depicts an alternative embodiment of the light injection surface shown in FIG. 2, in which each fiber has a different radial extent.
Figure 4:
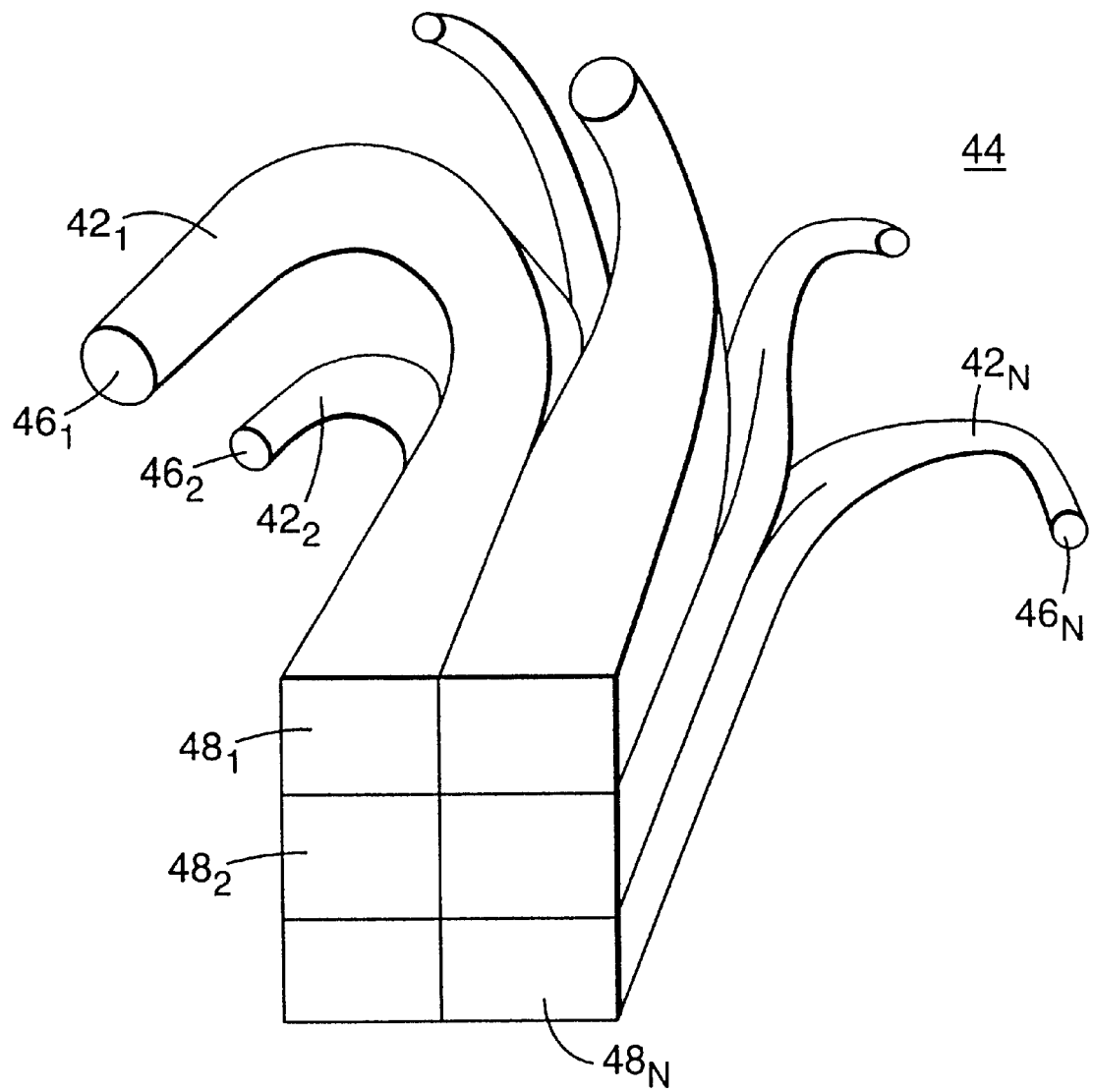
FIG. 4 depicts an alternative embodiment of the light injection surface shown in FIG. 2, in which the fibers have rectangular cross-sectional shapes.

One of ordinary skill in the art will recognize that light injection surfaces may be formed from many unique packing configurations in accordance with the principles of the present invention. For example, the sectors shown in FIG. 2 need not have the same dimensions. Rather, as shown in FIG. 3, the sectors may differ in radial extent. In FIG. 3, for example, fiber 32, extends over 180 degrees, fiber 322 extends over 135 degrees, and fiber 323 extends over 45 degrees. Moreover, the cross-sectional shape of the fiber input ends need not be sectors FIG. 4 shows an alternate configuration, in which the light injection surface comprises a number of rectangular ends. Each end $48_1, 48_2, \ldots 48_N$ of fibers $42_1, 42_2 \ldots 42_N$ can have a cross-section that is approximately square, and fibers $42_1, 42_2 \ldots 42_N$ can be molded so as to have an approximately circular cross-sectional configuration at respective output ends $46_1, 46_2, \ldots 46_N$. In general, the input ends of the light fibers can have any shape, regular (e.g., hexagonal or polygonal) or irregular, provided the resulting light injection surface is substantially free of voids. Additionally, the shape of the input ends need not all be the same. For example, the light fibers may be irregular shapes that interlock with one another, analogous to the pieces of a puzzle.

The particular packing arrangement that is used for any given application will be determined by a number of parameters, including the number of light fibers employed, the cross-sectional areas of the individual fibers (fibers with a greater cross-sectional area will transport a greater fraction of the total available light), and the cross-sectional shape of the input ends of the fibers. The values of these parameters will in turn be selected based on the given application for which the light transport device is to be used.

As seen in FIG. 1, the light fibers may undergo a gradual transition in their cross-sectional shape between their respective input and output ends. In the FIG. 1 embodiment, for example, while the input ends are shaped as sectors, the output ends are circular in shape, as in a conventional light fiber. The transition may occur over the entire length of fiber, or only over a portion thereof. In general, the cross-sectional shape of the input ends of the light fibers may be selected independently of the cross-sectional shape of the output ends. That is, the input and output ends may or may not have the same cross-sectional shape. While the shapes of the input and output ends of the light fibers may differ, it is advantageous in many embodiments that the fibers maintain substantially the same total cross-sectional area across their lengths so that light loss from the fiber is minimized.

The input ends of the light fibers forming the light injection surface may be held in place at the light input area by heat shrink tubing or by other appropriate mechanical or chemical bonding means that does not alter the optical properties of the interfaces.

The individual light fibers of the light transport device of the present invention may be fabricated in a molding process using, for example, a conventional two piece mold. Alternatively, the mold may be an expandable mold of the type disclosed in U.S. application Ser. No. 09/026,836, entitled "Method and Apparatus for Seamless Microreplication Using an Expandable Mold." Briefly, an expandable mold is formed from a flexible material having a generally hollow portion that corresponds to the shape of the desired finished article (i.e., the light fiber). The hollow portion is accessible through at least one opening. The hollow portion is filled with a curable material that hardens in the shape of the hollow portion of the mold. Once hardened, the finished article is removed by applying a pressure differential between the inside and outside of the mold so that the walls of the mold distend to facilitate removal of the molded article. Additional details concerning the expandable mold may be found in the previously mentioned patent application, which is hereby incorporated by reference in its entirety (including drawings) as if repeated herein.

Regardless of the type of mold that is employed, the curable material that forms the finished article may be any material that cures into a substantially optically transparent material and which can be introduced into the mold and cured at temperatures and/or pressure conditions that do not adversely affect the mold. The curable material may be curable by heat, radiation, or other known processes. Suitable curable materials are well known to the art and include polymerizable compounds and mixtures. Acrylates are a class of curable materials that are preferable for their transparency properties. Urethanes are also a desirable class of curable materials because their contraction during curing tends to be minimal, although only certain formulations have desirable transparency properties. Silicones comprise another desirable class of curable materials because of their transparency and heat resistance. Advantageously in the present invention, rigid materials, including rigid thermoplastics such as poly(methyl methacrylate, PMMA) or polycarbonate, can also be used in the present invention, since the prescribed cross-sectional shapes of the input ends are designed to intimately contact one another within a harness or bundle without substantial deformation.

The mold itself is fabricated from a molding master that is a positive replica of the finished light fiber. The master must be fabricated with a precision equal to the precision required of the geometry of the finished light guide. Such a high precision master can be fabricated from a machinable stock material capable of being separated from the molding material after the molding material has cured. For example, the stock material may comprise a machinable metal or a hard polymer. Suitable metals include copper and aluminum, and alloys such as brass. Suitable polymers include acrylics, carbonates, and any other polymer that may be machined and which retains its shape.

The molding master also may be fabricated by any of a number of rapid prototyping techniques known in the art such as, for example stereolithography. Once the shape of the master is determined and electronically stored in a Computer-Aided Design (CAD) file, suitable equipment is used to create a three-dimensional part representing the part design. In the case of stereolithography, the equipment, under the direction of the CAD file, drives a laser beam that selectively writes a trace on the surface of a photocurable polymer. As the laser beam travels according to the part design, it cures the polymer in layers. As the layers build up, a three-dimensional part is formed. This part is then removed and polished to an optical finish to be used in mold making. See, for example, W. Bruce Campbell, *Rapid Prototyping and Silicone Moldmaking Materials*, Dow Corning Corporation (1996) Form No. 10-702-96.

The molding material from which the mold is fabricated is a liquid composition that can be solidified during a curing process. The material is preferably one that undergoes low shrinkage during the curing process and is relatively easily removable from the master. The molding material should also be chosen to reduce adherence with the molded article so that the molded article can be readily released from the mold. Suitable curable materials are well known to the art and include, for example, elastomers such as a silicone elastomers. Alternatively, injection molding methods that are well known to those of ordinary skill in the art can be used advantageously to mold thermoplastic light guide materials.

The preceding description of the present invention is merely illustrative, and is not intended to be limiting. Therefore, the scope of the present invention should be construed solely by reference to the appended claims.

what is claimed is:

1. An apparatus for transporting light, comprising:
   a plurality of light guides, each of said light guides having first ends, wherein said first ends are assembled, essentially without deformation, to provide a light injection plane that is a continuous plane that is essentially free of voids, the interior of said plane further being essentially free of cladding materials.

2. The apparatus of claim 1, wherein said first ends form a bundled region that has a length sufficient to ensure that light directed from a light source into an end surface of said bundled region is substantially uniform in color when emanating from each second end of the light guides.

3. The apparatus of claim 2 wherein said length of the bundled region is also sufficient to ensure that light directed from a light source into an end surface of said bundled region is substantially uniform in intensity when emanating from each second end of the light guides.

4. The apparatus of claim 1, wherein said first ends form a bundled region that has a length sufficient to ensure that light directed from a light source into an end surface of said bundled region is substantially uniform in intensity when emanating from each second end of the light guides.

5. The apparatus of claim 1, wherein each of said first ends is rigid.

6. The apparatus of claim 1, wherein said first ends have outer perimeters, the adjacent edges of which are contiguous with one another.

7. The apparatus of claim 1, wherein at least one of said light guides has a second end, wherein said first end has an essentially non-circular cross-section, and wherein said second end has an essentially circular cross-section.

8. The apparatus of claim 1, wherein each of said light guides has a second end, and wherein each of said second ends has an essentially circular cross-section.

9. The apparatus of claim 1, wherein each of said plurality of first ends has a unique cross-sectional shape.

10. The apparatus of claim 1, wherein said first ends have essentially identical cross-sectional shapes.

11. The apparatus of claim 1, wherein the first and second ends of said light guides have essentially identical cross-sectional shapes.

12. The apparatus of claim 1, wherein each of said plurality of light guides has a longitudinal axis, and wherein the cross-sectional shape of each of said plurality of light guides undergoes a transition along said longitudinal axis from a first cross-sectional shape to a second cross-sectional shape.

13. The apparatus of claim 12, wherein said transition occurs over substantially the entire length of the light guide.

14. The apparatus of claim 1, wherein at least one of said first ends has a noncircular cross-sectional shape.

15. The apparatus of claim 14, wherein said noncircular cross-sectional shape is essentially a sector.

16. The apparatus of claim 1, wherein said apparatus comprises N light guides, where N is an integer greater than 1, and wherein each of said N light guides has a cross-sectional shape essentially defining a sector.

17. The apparatus of claim 16, wherein each of said N sectors subtends an angle of 360/N degrees.

18. The apparatus of claim 16, wherein a first of said N sectors subtends an angle $\phi_1$, wherein a second of said N circular sections subtends an angle $\phi_2$, and wherein $\phi_1 \neq \phi_2$.

19. The apparatus of claim 1, wherein each of said first ends has a cross-section that essentially describes a polygon.

20. The apparatus of claim 19, wherein said polygon is selected from a hexagon and a rectangle.

21. A method for transporting light from a light source to a plurality of prescribed locations so that at least one characteristic of the light arriving at the plurality of prescribed locations is substantially the same at each of the prescribed locations, said method comprising the steps of:
   directing light from the light source into a terminating surface of a bundled region formed by input ends of a plurality of light guides, said input ends being assembled, essentially without deformation, into a bundled region having a substantially continuous planar surface that is essentially free of voids, the interior of said planar surface further being essentially free of cladding materials, said bundled region being configured so that light propagating in each of the light guides undergoes mixing by being coupled from one light guide to another; and
   orienting output ends of the plurality of light guides so that light emitted therefrom is applied to the respective prescribed locations.

22. The method of claim 21 wherein said at least one characteristic of the light is its color.

23. The method of claim 21 wherein said at least one characteristic of the light is its intensity.

24. An apparatus for transporting light, comprising:
   an arrangement of N light guides, where N is an integer greater than 1, each of said N light guides terminating in a substantially planar terminal surface such that, for k=1 to N, the $k^{th}$ terminal surface essentially defines a sector $S_k$ which subtends an angle $\phi_k$; wherein the sum
   $$\sum_{k=1}^{N} \phi_k$$
   is essentially $2\pi$ radians, and wherein the terminal surfaces of said light guides are arranged into an essentially planar surface without deformation, which surface is substantially free of voids and cladding material.

25. The apparatus of claim 24, wherein said planar surface has an essentially circular perimeter.

26. The apparatus of claim 24, wherein said terminal surfaces are rigid.

27. An apparatus for transporting light, comprising:

an arrangement of N light guides, where N is an integer greater than 1, each of said N light guides terminating in a substantially planar terminal surface such that, for k=1 to N, the $k^{th}$ terminal surface essentially defines a rectangle $R_k$, and wherein the terminal surfaces of said light guides are essentially arranged without deformation into a rectangle R which is substantially free of voids and cladding material.

28. The apparatus of claim 27, wherein each of said terminal surfaces are rigid.

29. The apparatus of claim 27, wherein the rectangles in the set $R_1, \ldots, R_N$ have essentially the same dimensions.

30. The apparatus of claim 29, wherein said second cross-sectional shape is circular.

31. The apparatus of claim 27, wherein, for k=1 to N, the $k^{th}$ light guide has a cross-sectional shape which undergoes a transition along the longitudinal axis of said light guide from a first cross-sectional shape describing the rectangle $R_k$ to a second cross-sectional shape.

* * * * *

United States Patent and Trademark Office

CERTIFICATE OF CORRECTION

PATENT NO. : 6,614,972 B1
DATED : September 2, 2003
INVENTOR(S) : Lundin, David J.

It is certified that error appears in the above-identified patent and that said Letters Patent is hereby corrected as shown below:

Title page,
Item [56], References Cited, OTHER PUBLICATIONS, insert -- W. Bruce Campbell, "Rapid Prototyping and Silicone Moldmaking Materials", Dow Corning Chemical Corporation, Midland, MI © 1996, Dow Corning Corporation --

Column 5,
Line 8, after the word "described", delete "to".
Line 29, delete "32," and insert in place thereof -- $32_1$ --.
Line 29, delete "322" and insert in place thereof -- $32_2$ --.
Line 30, delete "323" and insert in place thereof -- $32_3$ --.
Line 32, after the word "sectors" insert -- . --.

Column 7,
Line 29, delete "what" and insert in place thereof -- What --.

Column 8,
Line 19, delete "1" and insert in place thereof -- 1 --.

Signed and Sealed this

Eleventh Day of May, 2004

JON W. DUDAS
*Acting Director of the United States Patent and Trademark Office*